United States Patent [19]

Otten, III

[11] 3,926,046

[45] Dec. 16, 1975

[54] SYSTEM FOR MEASURING UNSTEADY AERODYNAMIC TORQUES

[75] Inventor: Leonard J. Otten, III, Sunnyvale, Calif.

[73] Assignee: The United States of America as represented by the Secretary of the Air Force, Washington, D.C.

[22] Filed: Nov. 8, 1974

[21] Appl. No.: 522,365

[52] U.S. Cl................................................ 73/133 R
[51] Int. Cl.² ........................................ G01N 3/22
[58] Field of Search........... 73/147, 133 R, 189, 389

[56] References Cited
UNITED STATES PATENTS

| | | | |
|---|---|---|---|
| 2,782,636 | 2/1957 | Peacker .................... | 73/133 R X |
| 3,352,154 | 11/1967 | Djorup ...................... | 73/189 |
| 3,455,155 | 7/1969 | Greenberg et al. ...... | 73/147 |

Primary Examiner—Jerry W. Myracle
Attorney, Agent, or Firm—Joseph E. Rusz; Julian L. Siegel

[57] ABSTRACT

A system for determining the collective torque resulting from a fluctuating pressure field upon a cavity subjected to aerodynamic flow is determined by mounting a plurality of high response pressure transducers about a shell in a cavity with each of the transducers located at the centroid of an area being investigated. Associated with each of the transducers are electrical signals representing each of the particular areas and signals representing the distance from the centroid of that area to the axis of interest. These signals and the transducer signals are fed to associated multiplying circuits and their products are summed in a summing circuit, the output thereof being the resultant torque.

2 Claims, 3 Drawing Figures

SYSTEM FOR MEASURING UNSTEADY AERODYNAMIC TORQUES

STATEMENT OF GOVERNMENT INTEREST

The invention described herein may be manufactured and used by or for the Government for governmental purposes without the payment of any royalty thereon.

BACKGROUND OF THE INVENTION

It is generally desirable to have minimum optical losses along a light path from the aircraft to an external point, such as a star, for viewing in a telescope. Often an open port is used to minimize the surface reflection, scattering, and absorption associated with a window material. The cavity beneath the open port, when exposed to the free stream, can act as an acoustic resonator and amplify internal pressure fluctuations which in turn effect internal optical components, particularly components mounted on positioning devices.

Previous studies considered openings in an aircraft fuselage with associated wind tunnel experiments. It has been shown experimentally the effect of varying the angle of incidence of a resonant cavity in a cylinder in a stream and resonance in a cavity in a sphere in subsonic flow has been measured. Transonic turret drag and open cavity internal loads have been studied and it was found that the acoustics were related to external flow phenomena. Extensive work has been done on cavity flows, however comprehensive literature searches indicate there are no tests of open cavities in blunt protruberances at transonic wind speeds. This invention supplies that need.

SUMMARY OF THE INVENTION

This invention is a technique for measuring the unsteady forces and torques felt by a surface exposed to a fluctuating field. It has a primary use in the estimation of forces and torques resulting from unsteady air loads experienced by a surface in flight or in a wind tunnel. The surface which is exposed to the fluctuating pressure field is instrumented with high response pressure transducers which are mounted upon the centroid of a predetermined area. Signals from the transducers and area and torque arm indicator are fed to multipliers and the outputs are then summed.

It is therefore an object of the invention to provide a method and system for measuring varying aerodynamic torques and pressures.

It is another object to provide a method and system of measuring acoustic inputs resulting from an air stream on an open cavity.

It is yet another object to provide a method and system of protecting airborne optical devices from acoustic vibrations.

It is still another object to provide a method and system of accurately measuring high frequency components of a force or torque with relative ease and with standard pressure measuring equipment.

It is still another object to provide a torque measuring system for measuring acoustic vibrations that eliminate the need for complicated strain gauge balances that have high natural frequencies.

These and other objects, features and advantages of the invention will become more apparent from the following description taken in conjunction with the illustrative embodiment in the accompanying drawings.

DETAILED DESCRIPTION OF THE PREFERRED EMBODIMENT

Figure 1:
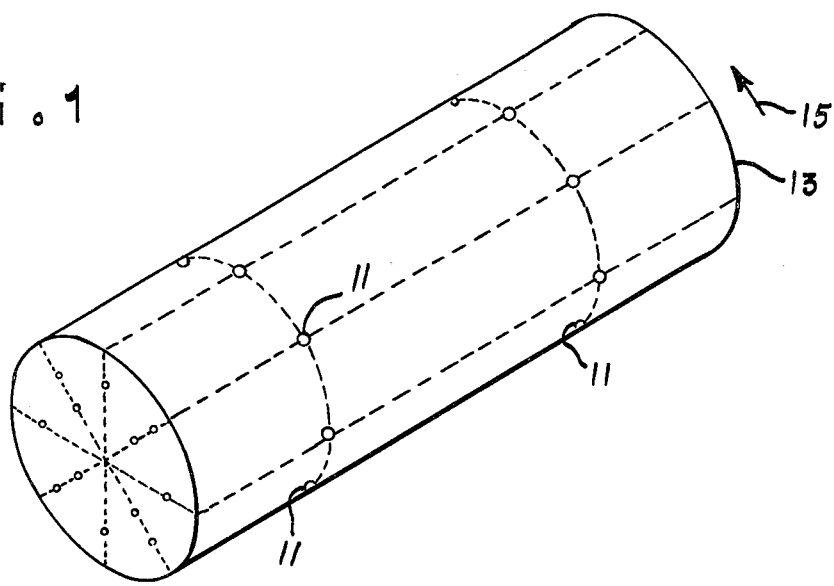
FIG. 1 is a diagram showing a shell to be mounted in a cavity together with the positioning of the transducers.

The measurements of unsteady pressures creating aerodynamic torques are made using a plurality of high frequency response transducers. An example of such a transducer is the Kulite Model XCQL-14-093-025 which has a frequency response from zero to 50 kHz. As shown in FIG. 1, these transducers collectively designated as 11 are mounted about shell 13 which is positioned inside the cavity being investigated. The aerodynamic flow or moving air is indicated by arrow 15.

Figure 2:
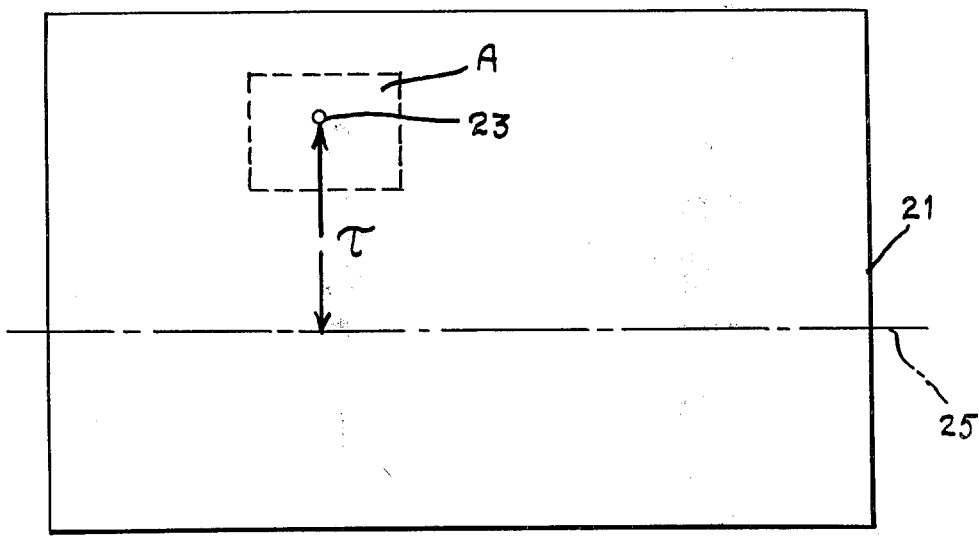
FIG. 2 shows the geometric relationship of the transducers to the surface area being investigated.

Each transducer measures the pressure at a particular point and the torque in each of the points is obtained. Referring to FIG. 2, on surface 21 the transducer pickup is mounted in area A at centroid 23 and is located at a distance $\tau$ from the axis of interest 25.

Figure 3:
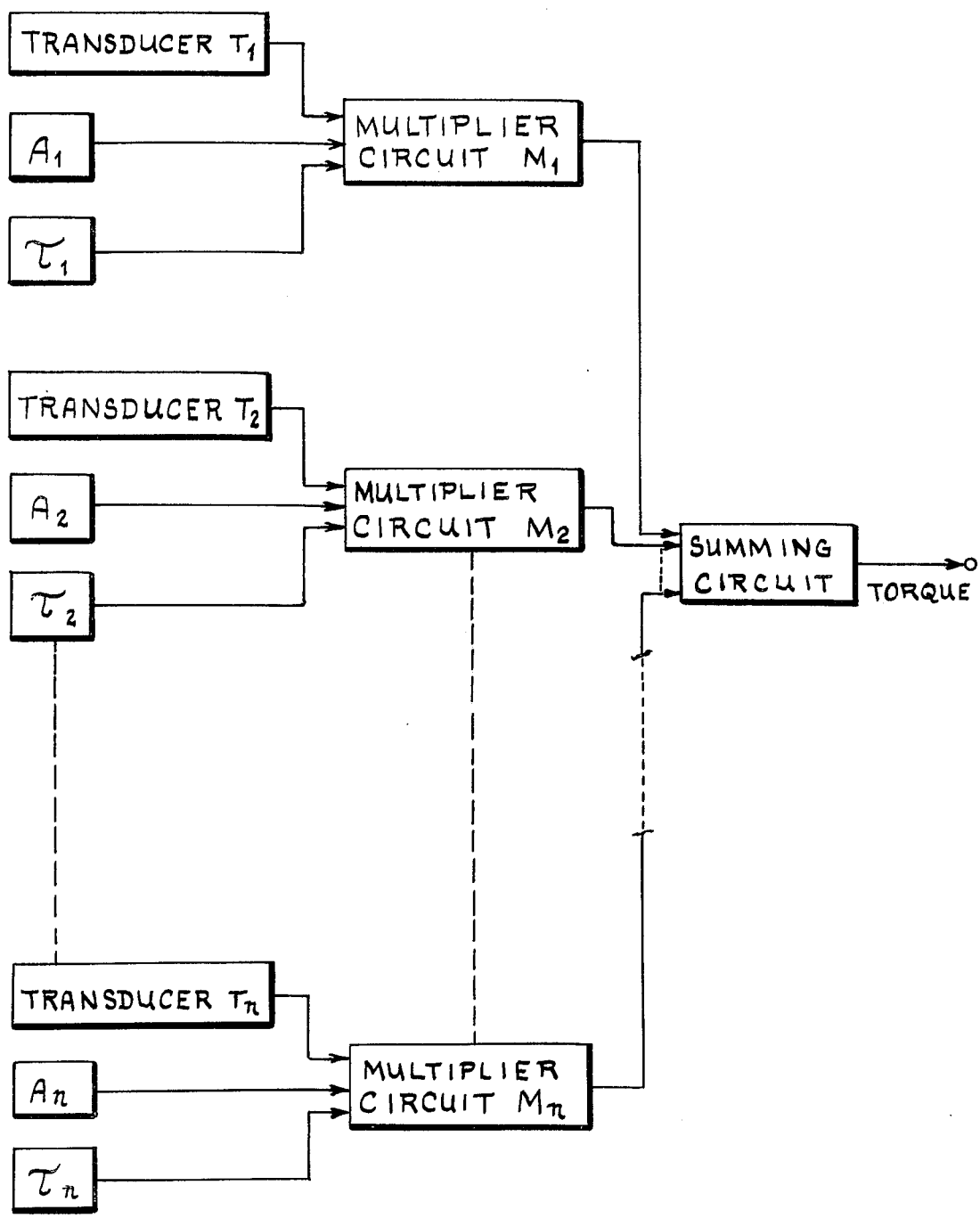
FIG. 3 is a schematic diagram showing an embodiment of the invention.

The resultant torque about the cavity being investigated is obtained by the instrumentation shown in FIG. 3. Transducers $T_1$, $T_2$ to $T_n$ determine the pressure at each centroid and convert the pressure into an electrical quantity such as a voltage. Electrical quantities also represent the associated area $A_1$, $A_2$ to $A_n$ for each of the transducers and a third set of electrical quantities $\tau_1$, $\tau_2$ and $\tau_n$ represent the distance from the centroid to the axis of interest. Each of the electrical quantities are fed to respective multipliers $M_1$, $M_2$ to $M_n$. These multipliers are well known in the art and can be either analog multipliers if the input quantities are voltages or digital multipliers if the input quantities are digital pulse trains.

Each of the products from the multipliers $M_1$, $M_2$ to $M_n$ are then fed to the summing circuit which can be either an analog or digital device, dependent upon the form of the input. The output then represents the desired resultant torque.

The accuracy of the measurement is increased as the number of areas is increased. Summing of the various quantities is thus preferably performed on a real time basis to avoid phase lags between the various signals. The frequency capability of this invention is limited only to the frequency capability of the pressure transducer and summing circuit.

The collective value of normal forces on the surface are obtained by summing the outputs of the multiplier circuits but not including the signals $\tau_1$, $\tau_2$ and $\tau_n$. The same embodiment can be used to obtain the collective forces as that shown in FIG. 3 but omitting the signal sources $\tau_1$, $\tau_2$ to $\tau_n$.

What is claimed is:
1. A system for determining the collective aerodynamic normal pressures in a cavity comprising:
   a. a shell positioned inside the cavity;
   b. a plurality of high response pressure transducers uniformly positioned about the shell, each transducer being associated with a predetermined area thereabout;

c. a plurality of signal sources associated with one each of the pressure transducers and indicating the particular area of interest about the transducer;

d. a plurality of multiplying circuits fed by one each of the pressure transducers and one each of the plurality of signal sources; and e. a summing circuit fed by the plurality of multiplying circuits, the outputs indicating the collective pressure.

2. A system for determining the collective aerodynamic torque in a cavity comprising:

a. a shell positioned inside the cavity;

b. a plurality of high response pressure transducers uniformly positioned about the shell, each at the centroid of a predetermined area;

c. a first plurality of signal sources associated with one each of the pressure transducers and indicating the particular area of interest about the centroid;

d. a second plurality of signal sources associated with one each of the pressure transducers and indicating the distance between the centroid and a predetermined axis;

e. a plurality of multiplying circuits fed by one each of the pressure transducers, one each of the first plurality of signal sources, and one each of the second plurality of signal sources; and f. a summing circuit fed by a plurality of multiplying circuits, the output indicating the collective torques.

* * * * *